(12) United States Patent
Danduran et al.

(10) Patent No.: US 6,549,819 B1
(45) Date of Patent: Apr. 15, 2003

(54) METHOD OF PRODUCING A THREE-DIMENSIONAL IMAGE

(76) Inventors: Larry Dale Danduran, 302 1$^{st}$ Ave. NE., New Rockford, ND (US) 58356; Morgan Mark Lies, 18 9$^{th}$ St., New Rockford, ND (US) 58356

( * ) Notice: Subject to any disclaimer, the term of this patent is extended or adjusted under 35 U.S.C. 154(b) by 226 days.

(21) Appl. No.: 09/593,649

(22) Filed: Jun. 13, 2000

(51) Int. Cl.$^7$ .............................................. G06F 19/00
(52) U.S. Cl. ......................... 700/98; 700/118; 345/419
(58) Field of Search .......................... 700/98, 118, 120, 700/182, 163, 161, 180, 166; 446/391; 345/419–420; 382/128

(56) References Cited

U.S. PATENT DOCUMENTS

| | | | |
|---|---|---|---|
| 4,659,319 A | 4/1987 | Blair | 446/87 |
| 5,009,626 A | 4/1991 | Katz | 446/391 |
| 5,280,305 A | 1/1994 | Monroe et al. | 347/129 |
| 5,314,370 A | 5/1994 | Flint | 446/391 |
| 5,429,682 A | 7/1995 | Harlow, Jr. et al. | 118/681 |
| 5,515,592 A | 5/1996 | Mills | 29/412 |
| 5,543,103 A * | 8/1996 | Hogan et al. | 264/219 |
| 5,596,503 A | 1/1997 | Flint | 700/118 |
| 5,779,516 A | 7/1998 | Thorne | 446/98 |
| 5,803,788 A | 9/1998 | Penberethy et al. | 446/391 |
| 5,926,388 A | 7/1999 | Kimbrough et al. | 700/118 |
| 6,177,034 B1 * | 1/2001 | Ferrone | 264/40.1 |
| 6,244,926 B1 * | 6/2001 | George et al. | 446/391 |
| 6,340,353 B1 * | 1/2002 | Pomatto et al. | 602/17 |

* cited by examiner

Primary Examiner—Leo Picard
Assistant Examiner—Zoila Cabrera
(74) Attorney, Agent, or Firm—Curtis Harr

(57) ABSTRACT

A method of producing three-dimensional copies of individual human faces and heads is provided that employs a method of production in which all of the components except for the face area are standardized. This method of construction vastly reduces the costs involved in the production of these types of models and allows for the generation of three-dimensional models of individual faces at costs that will make them available to a greater portion of the population as a whole.

14 Claims, 5 Drawing Sheets

FIG 2
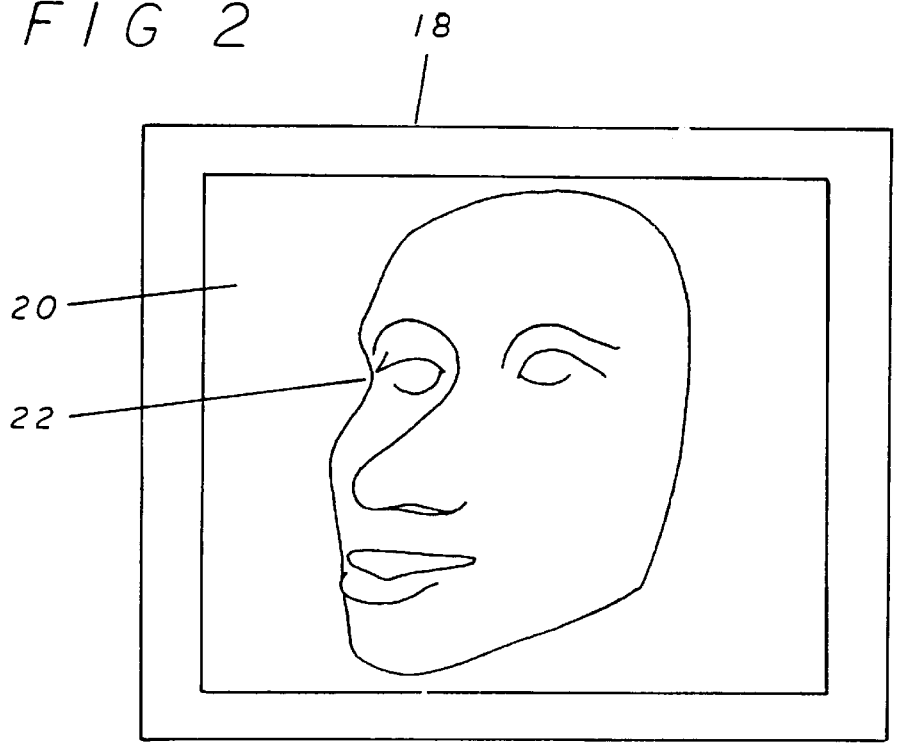
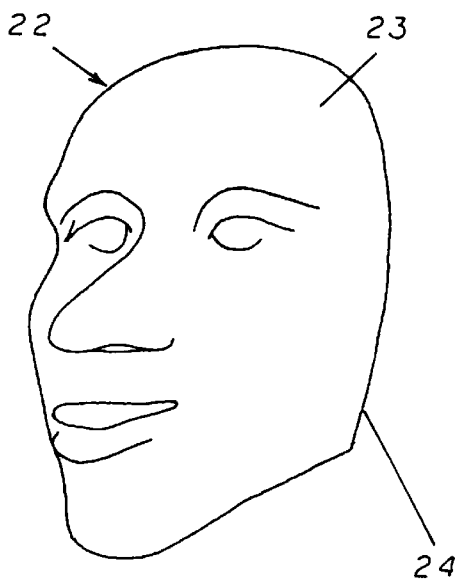
FIG 3
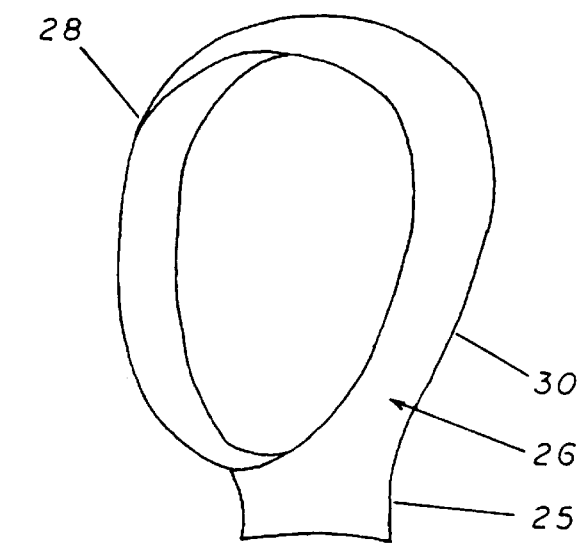
FIG 4

FIG 5
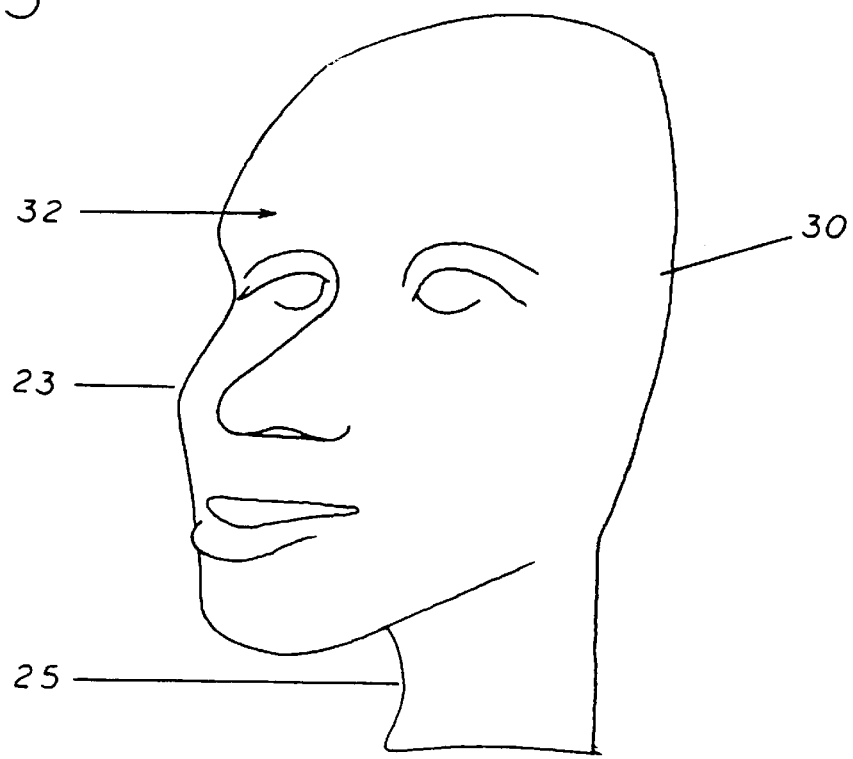
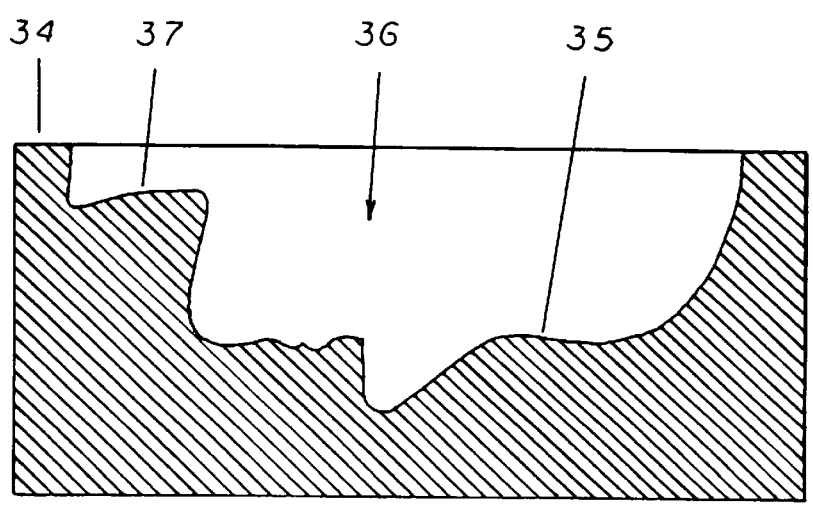
FIG 6

METHOD OF PRODUCING A THREE-DIMENSIONAL IMAGE

BACKGROUND OF THE INVENTION

The present invention relates to a system and method for producing three-dimensional images. More particularly, to a system and method for producing three-dimensional images of a person's face and meshing this image with a pre-existing collar forming the back portion of a head.

It has been found that for a variety of reasons it may be desirable to produce a three-dimensional likeness of a human being. One example might be for parents who would like to preserve a three-dimensional likeness of their youngsters as a life-like memento. It has long been the practice to hand make life-like dolls of humans and the present invention is aimed at assisting in modernizing this process.

Several art devices disclose the use of modern equipment in order to take measurements of a human form and reproduce a solid three-dimensional object. One such invention is disclosed in U.S. Pat. No. 5,926,388 issued to Kimbrough, et al. This patent discloses the use of a three-dimensional laser and moving platform in order to take a measurement of a head, process these measurements, and produce a three-dimensional relief of a person's head. This practice can be rather time consuming and expensive as it measures the entire 360 degree surface of the head and reproduces a relief.

U.S. Pat. No. 5,803,788 issued to Penberthy, et al. discloses the use of an existing doll having a flat facial section whereby a picture or photograph may be transferred onto this flat portion in order to fill in two-dimensional facial details. This system, although relatively simple and cost effective, does not produce a realistic three-dimensional facial image.

From this discussion, it can be seen that it would be desirable to find a way to quickly and inexpensively produce a three-dimensional relief of a given face and mate this relief with pre-existing features to complete the entire three-dimensional product as desired. This method should require minimal physical hardware and software in order to allow a user to take measurements in almost any setting and either immediately reproduce the three-dimensional replica or reproduce this replica at a later more convenient time.

SUMMARY OF THE INVENTION

It is the primary objective of the present invention to provide a method by which a three-dimensional object, such as a human face, can be digitized and stored within a typical computer and which digital image can then be used to produce a replica of that object.

It is an additional objective of the present invention to provide such a method which by design captures only a specified portion of the original object, such as the face portion of a human head, which is then most commonly meshed to a one of a plurality of digitized collars which have a standardized rear surface and that are also stored within the memory of the computer.

It is a further objective of the present invention to provide such a method of producing three-dimensional copies of objects that also employs the use of a plurality of standardized rear portions of heads to which the face and collars that are produced by the imaging process can be attached to form a complete copy of a human head.

It is a still further objective of the present invention to employ such a method of construction that uses standardized components in all noncritical areas so that the cost of production can be made as low as possible while still producing an accurate copy of a three-dimensional image such as a human face.

These objectives are accomplished by the use of a three-dimensional imaging system that employs a digitizing scanner, or other three dimensional image capturing system, that is commonly available in the marketplace today. This digitizing scanner is used to digitize an object (in the case of the present invention, a human face) by placing it in front of the object and then rotating around the portions of the object that the user wishes to convert to a digital matrix. This digital matrix is then transferred to a computer where it is stored in a manner that will allow it to be viewed and edited by the use of the present invention as needed. Additionally, the computer also serves to process the digital image into a form that is appropriate to generate a milling program that is required to produce a three-dimensional mold of the original object that was digitized by the use of the scanner. This milling program can then be easily transferred to a milling machine in a form that can be used to produce either a relief, or mold, for the direct production of the three-dimensional object or an image for the production of a mold by an alternative production method.

The most important aspect of the present invention is that the scanner is employed only to digitize a specific area of the object such as the individual characteristics of a human face. These characteristics are generally contained in the most forward third of the human head as a whole and so it is only necessary to digitize that forward third of the head. This is important in that while other three-dimensional imaging systems available today digitize the entire object (in this case most commonly the entire human head), the present invention saves both time and money in that it requires that only the face area be digitized and transferred to the computer.

Once the digitizing process has been completed, the user then employs the computer to manipulate the stored image of the human face. The primary phase of this manipulation process is the meshing of the digitized face with a preexisting digital collar that is stored within the computer. The collar is most commonly stored in a plurality of configurations and sizes so as to provide a number of different bases for the meshing process with the digitized face. This means that for each individual face that is digitized there is a collar that has a shape that closely matches that of the face so that there is very little, if any, distortion of the facial features during the meshing process. Thus, the design of this system enables the user to match an individual face to one of the specific preexisting collars which allows for the production of a mold of the front half of a human head which has a rear surface of standardized proportions.

Once the meshing of the digitized face and collar has been completed, the mold for the front half of the head can be completed. An additional aspect of the mold that is produced in this fashion is that the most rearward surface is configured in a manner and shape that allow it to be easily mated to an existing mold of a standardized back portion of a human head. The rear head molds are configured and designed in much the same manner as the head collars in that there are a plurality of different sizes and shapes designed to fit a specific collar and face type perfectly to produce a complete three-dimensional model of the original human model.

The use of the present invention significantly increases the efficiency of producing three-dimensional copies of human heads because only approximately one third of each finished product of the process must be individually produced while the other two thirds can be mass produced to a plurality of different specifications. The method of production that is described by the present invention is superior to other methods because it greatly reduces costs and speeds up the production of three-dimensional models. Additionally, the present invention uses modern methods of mass production of such models while still retaining the individual characteristics of each face, thus, making such models more affordable to all.

For a better understanding of the present invention reference should be made to the drawings and the description in which there are illustrated and described preferred embodiments of the present invention.

DESCRIPTION OF THE DRAWINGS

FIG. 2 is a front elevation view of a typical computer monitor and details the manner in which the image captured by the digitizing scanner is displayed for working purposes on the computer screen.

FIG. 3 is a perspective representation of the three-dimensional image and illustrates the orientation of its major components.

FIG. 4 is a perspective representation of a standardized digital collar that is stored within the computer and is employed to adapt the digitized image to one of a plurality of predetermined dimensions.

FIG. 5 is a perspective representation of the digital image and collar once they have been meshed together within the computer.

FIG. 6 is a side elevation cutaway view of the block mold that is created with the use of the three-dimensional image that is created and stored within the computer and which is used to create the final three-dimensional model that is the objective of the present invention.

DESCRIPTION OF THE PREFERRED EMBODIMENT

Figure 1:
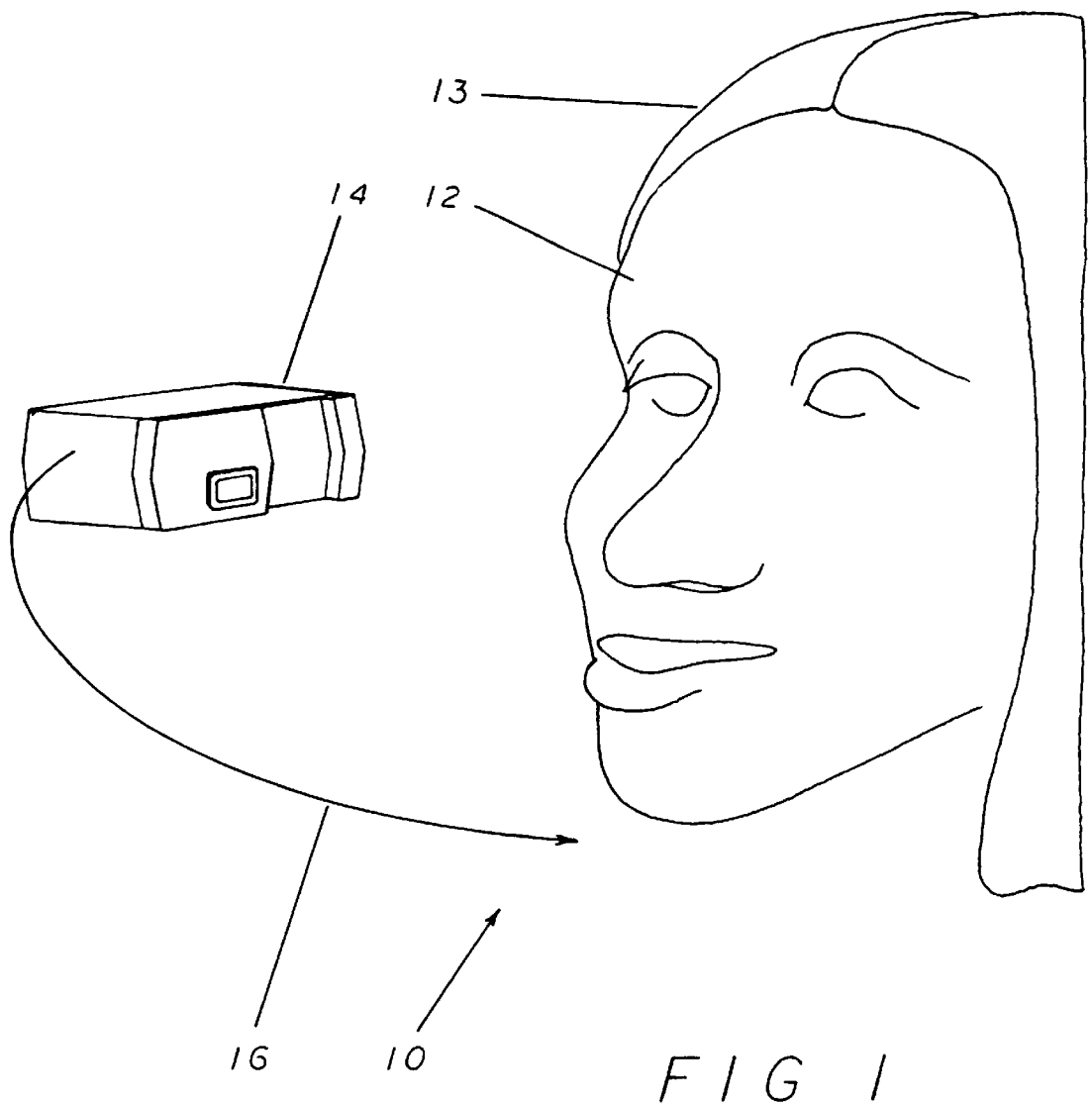
FIG. 1 is a perspective view of the present invention which illustrates the manner in which the digitizing scanner is employed to capture a three-dimensional image, such as a human face, and store it in a three-dimensional representation in a computer.

Referring now to the drawings, and more specifically to FIG. 1, the three-dimensional modeling process 10 is made up of a digitizing scanner 14 which is employed to capture an image and to digitize it in a manner which can be manipulated by a computer. In this use of the digitizing scanner 14, it is attached to an electronic storage device, very often a computer, by means of a transfer cable. This connection allows for the digitized information to be stored in a manner that will allow for its immediate or later use in the present invention's objective of producing three-dimensional models.

The digitizing scanner 14 is employed by first placing it in front of a human face 12 at the proper distance and in the proper orientation in relation to the human face 12. Once this setup process has been completed, the digitizing scanner 14 is then rotationally passed over the human face 12 in a partially circular scanner path 16 over the portions of the human face 12 that the user wishes to digitize. The digitizing scanner 14 operates by projecting a low-level laser beam onto the surface of the human face 12 and then measuring the amount of time that it takes for the reflected beam to return to the digitizing scanner 14. This time measurement accurately determines the distance between the human face 12 and the scanner by the use of its internal optical range finder. By making a great deal of these measurements in a single pass over the entire surface that you wish to digitize, a copy of the human face 12 can be compiled as a multitude of points within a three-dimensional frame work that, when taken as a whole, accurately recreate the surface individualities of any human face 12.

It is also important to note that the human hair 13 on the human face 12 that is being used as a model is not digitized by either this scanning process or it is removed after the process has been completed. This is because the hair can be more easily added to the completed model after the other processes of its manufacture have been completed. This method of finishing of the created model aids in the production efficiency of the present invention as it allows for more standardized methods of manufacturing to be employed during production which lessens not only the costs of production but also the costs to the final consumer of the product.

The processes of the present invention that are accomplished by the manipulation of the digital matrix provided by the digitizing scanner 14 within a computer are illustrated in FIGS. 2, 3, 4, and 5. The primary digital image 22 which is a visual representation of the matrix created by the digitizing scanner 14 and it is displayed on the monitor screen 20 of a computer monitor 18. The use of the computer allows the user to work with the primary digital image 22 by manipulating it on the monitor screen 20. In so doing, the user can orient the primary digital image 22 at any possible angle, allowing him to check, manipulate, and correct any aspect of the primary digital image 22.

The primary digital image 22 (as further illustrated in FIG. 3) is made up of the digitized face 23 area and the primary image mesh edge 24 which is basically just the most rearward edge of the digitized face 23. The digitized face 23 is the projected result of the digital matrix that was generated by the digitizing scanner 14. That is to say, the digitized face 23 is the visual representation of the measurements taken by the digitizing scanner 14 which is formatted and displayed in a fashion that allows a user to visually check and make any necessary adjustments to it and which will also be used to generate a program that will be used at a later stage of production to produce a copy of the displayed image.

The primary image mesh edge's 24 function within the purpose of the invention is to provide a point at which a standardized digital collar 26 can be electronically attached. The standardized digital collar 26 is a component of the present invention which serves to adapt the shapes and contours of each individual face to one of a fixed plurality of sizes and shapes so that the finished product of the described process can be standardized to the highest degree possible. This is accomplished by the creation of a plurality of standardized digital collars 26 that each generally cover a portion of the possible spectrum of shapes and sizes of human faces 12. By the use of this method of production, each individual primary digital image 22 is matched to the standardized digital collar 26 that most closely matches its shape and size and is meshed to the forward collar mesh edge 28 of the standardized digital collar 26. Any discrepancies between the dimensions of the primary image mesh edge 24 and the forward collar mesh edge 28 are corrected by the computer in a manner that eliminates any possible distortion to the features of the digitized face 23 this is done by changing the collar and specifically the forward collar mesh edge 28 so as to match the primary image mesh edge 24. This ensures that the object that is produced by the present invention will not only be an accurate copy of the human face 12 that was originally digitized but will also be of a standardized size and shape, as the rearward collar mesh edge 30 is held constant, thus, increasing the efficiency of the production process.

The standardized digital collar 26 (which is further illustrated in FIG. 4) is made up of the forward collar mesh edge 28, which is manipulated during the meshing process, the rearward collar mesh edge 30, which is held constant during the meshing process, and the digitized neck 25. The function of the forward collar mesh edge 28 has been fully discussed in the preceding paragraph. The function of the rearward collar mesh edge 30 is to connect the completed secondary digital image 32 to an additional component which is most often done after the computerized stages of production. The digital collar also contains the digitized neck 25 which basically represents the forward half of the neck of the human head 12 that was originally digitized and which serves as a platform for the final image that is produced by the use of the present invention.

The secondary digital image 32 which is the result of meshing the primary digital image 22 to the standardized digital collar 26 (which is further illustrated in FIG. 5) has as its primary components the digitized face 23 and the digitized neck 25. The function of the secondary digital image 32 is that it represents the final product of the computer generated phase of production and is the image that is transferred to a milling program that is exported from the computer and used to generate the molds that are used in the production of the three-dimensional image that is the purpose of the present invention's process.

The above described milling process is most commonly used to produce a mold block 34 which is illustrated in FIG. 6 and is used to produce the final product of the invention. The mold block 34 is made up of a block of relatively dense material into which a mold relief 36 is created by the use of a common high speed milling machine. The mold relief 36 is essentially a negative of the secondary digital image 32 that was produced in the computer and is created by the milling machine's milling tool being directed to specific points within the mold block 34 by the milling program created by the computer. The mold relief 36 is made up of the face form 35 which contains the facial features of the individual that was digitized and the neck form 37 which is made up of the neck portion of the computer's standardized digitized collar 26. This provides a means by which a form material can be poured into mold relief 36 and left to harden and assume the likeness of the original digitized model.

Figure 7:
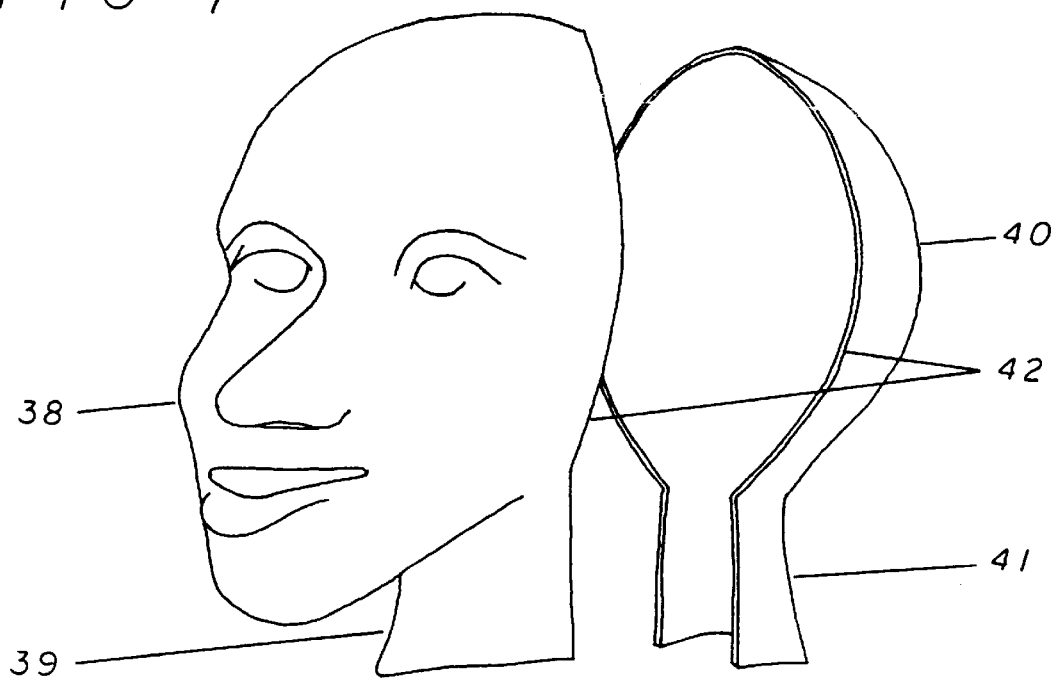
FIG. 7 is a perspective view of the three-dimensional image produced by the block mold prior to its being attached to one of the pluralities of standardized rear head components of the invention.
Figure 8:
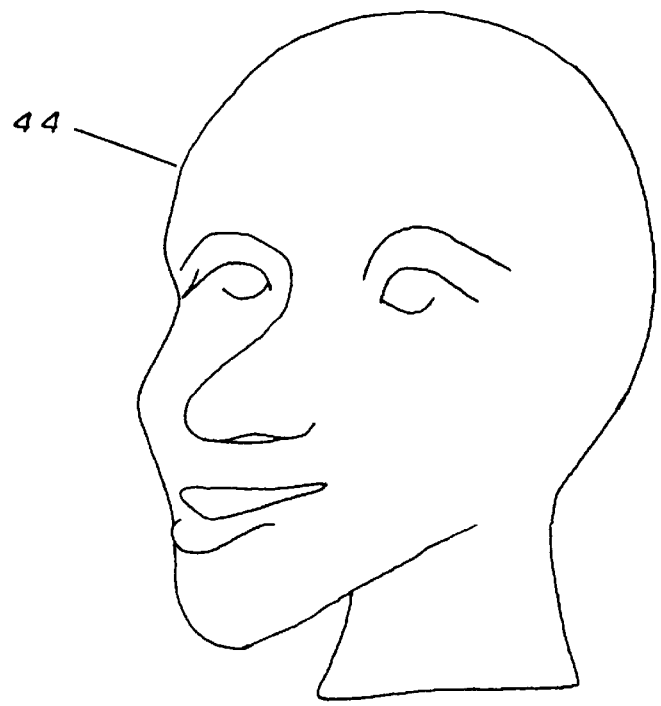
FIG. 8 is a perspective view of a completed three-dimensional image which has been produced by the use of the present invention.

The results of the use of the computer generated secondary digital image 32 and the mold block 34 are illustrated in FIGS. 7 and 8 in which a three-dimensional image 38 is shown being attached to and as attached to a three-dimensional head back 40. The three-dimensional image 38 is the result of the material that came from its setting in the mold relief 36 portion of the mold block 34. The three-dimensional image 38 is attached to a preexisting three-dimensional head back 40 which is again a standardized unit that can be formed is a plurality of shapes and sizes to conform to the rear edge of the three-dimensional image 38. The relative uniformity of the three dimensional head back 40 components serves to further the present invention's purpose of lessening production costs by standardizing as many components of a three-dimensional copy as possible.

The three-dimensional image 38 and the three-dimensional head back 40 are joined together by attaching them at the image joining surfaces located at the most rearward edge of the three dimensional image 38 and the most forward edge of the three dimensional head back 40. This joining of the two components also joins the forward three dimensional neck 39 to the rearward three dimensional neck 41 which forms a stable platform upon which the three-dimensional figure can rest for display purposes. Thus, the processes involved in the present invention are employed to produce a complete three-dimensional image 44 that is a vary accurate copy of an individual face for as low of a cost that is feasiblely possible.

Figure 9:
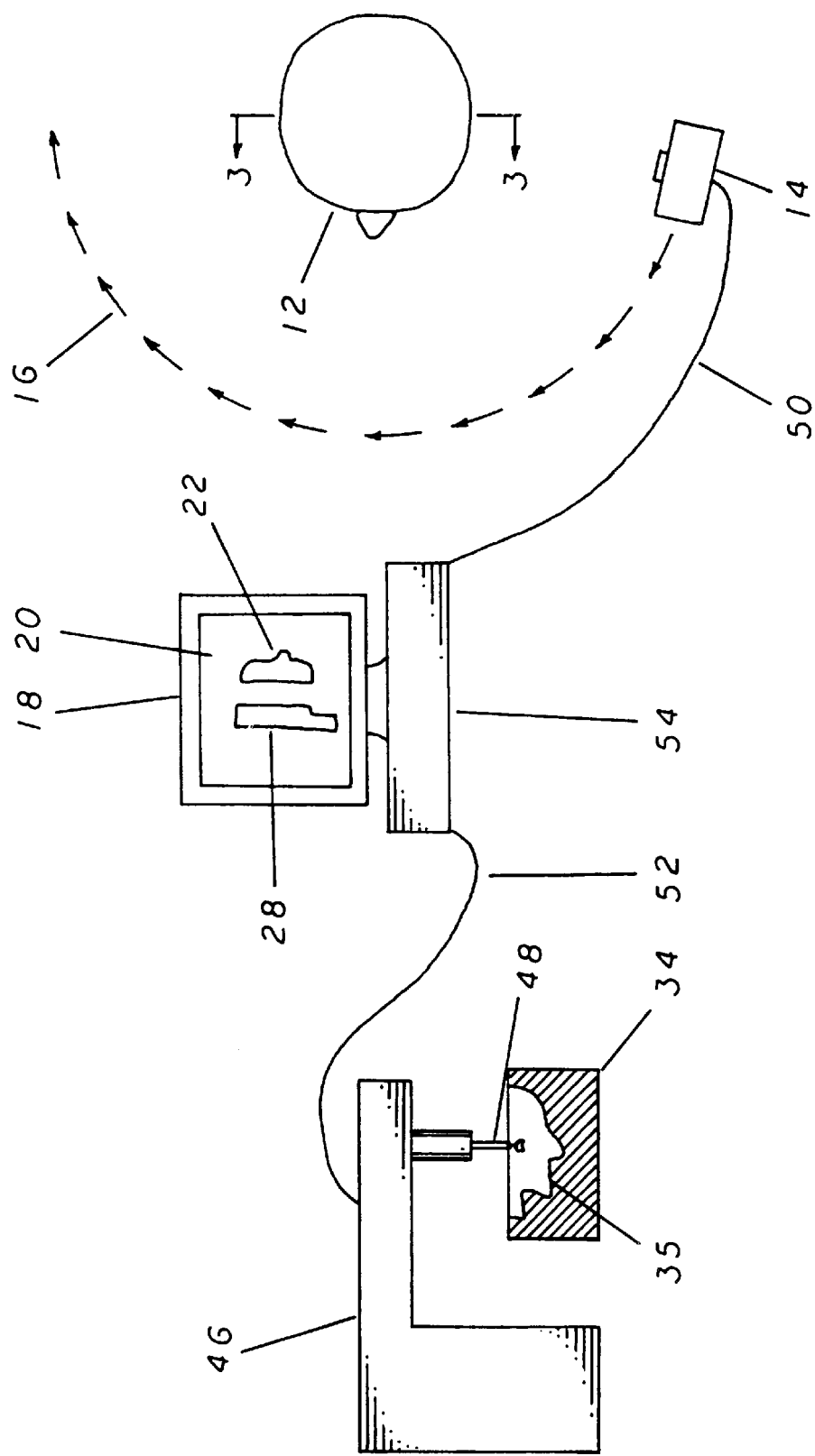
FIG. 9 is a schematic representation of the processes involved in the production of the present invention with line 3 defining the portion of the human head that is scanned and digitized for processing and production by a computer and milling machine.

Finally, FIG. 9 illustrates the entirety of the processes involved in the production of the present invention. A human face 12 is digitized by passing a digitizing scanner 14 in a semi circular scanner path 16 around the front portion of the human face 12. The digitized information that is captured in this manner is then fed to a computer 54 through the scanner wire 50 where the primary digital image 22 is joined with a standardized digital collar 26 which is visually accomplished on the monitor screen 20 of the computer monitor 18. Once this process is complete, the digitized information which represents the primary digital image 22 and forward collar mesh edge 28 is sent to the milling machine 46 through the milling machine wire 52. The milling machine 46 is then used to produce a face form 35 within a mold block 34 by the use of the milling tool 48 which spins at a high rate of speed and removes material from the mold block 34 or from a relief (not shown on this drawing)as specified by the information provided it by the computer 54.

Although the present invention has been described in considerable detail with reference to certain preferred versions thereof, other versions are possible. For example, this process may be equally usable with animals if so desired. Therefore, the spirit and scope of the appended claims should not be limited to the description of the preferred versions contained herein.

What is claimed is:

1. A method of producing a three-dimensional relief of a given human head said method comprising the steps of:

digitizing the front facial features of a given subjects front facial region into a computer;

suppling a collar measurement which divides said head into a front facial section and a rear of the head section having a pre-defined rear measurement to said computer;

digitally manipulating said front facial features so as to mesh said front facial region with said collar so as to not change said pre-defined rear measurement;

suppling said front facial features meshed to said collar in the form of data readable by a milling machine to a milling machine; and milling, from said data, a mold to represent said front facial features meshed to said collar so as not to change said pre-defined rear measurement.

2. A method of producing a three-dimensional relief of a given human head as in claim 1 further comprising the step of producing a relief of the front facial region with said collar from said mold.

3. A method of producing a three-dimensional relief of a given human head as in claim 2 further comprising the step of joining said relief to a pre-defined rear head section said rear head section having a front measurement matching said rear measurement of said collar so as to produce a complete head when joined.

4. A method of producing a three-dimensional relief of a given human head as in claim 3 further comprising the step of adding hair to said head.

5. A method of producing a three-dimensional relief of a given human head as in claim 4 further comprising the step of joining said head with a pre-defined body section.

6. A method of producing a three-dimensional relief of a given human head as in claim 3 wherein said head is formed of a soft latex material.

7. A method of producing a three-dimensional relief of a given human head said method comprising the steps of:

digitizing the front facial features of a given subjects front facial region into a computer;

suppling a collar measurement which divides said head into a front facial section and a rear of the head section having a pre-defined rear measurement to said computer;

digitally manipulating said front facial features so as to mesh said front facial region with said collar so as to not change said pre-defined rear measurement;

suppling said front facial features meshed to said collar in the form of data readable by a milling machine to a milling machine; and milling, from said data, a relief to represent said front facial features meshed to said collar so as not to change said pre-defined rear measurement.

8. A method of producing a three-dimensional relief of a given human head as in claim 7 further comprising the step of joining said relief to a pre-defined rear head section, said rear head section having a front measurement matching said rear measurement of said collar so as to produce a complete head when joined.

9. A method of producing a three-dimensional relief of a given human head as in claim 8 further comprising the step of adding hair to said head.

10. A method of producing a three-dimensional relief of a given human head as in claim 9 further comprising the step of joining said head with a pre-defined body section.

11. A method of producing a three-dimensional relief of a given human head as in claim 8 wherein said head is formed of a soft latex material.

12. A method of producing a three-dimensional relief of a given head said method comprising the steps of:

digitizing the front facial features of a given subjects front facial region into a computer;

suppling a collar measurement which divides said head into a front facial section and a rear of the head section having a pre-defined rear measurement to said computer;

digitally manipulating said front facial features so as to mesh said front facial region with said collar so as to not change said pre-defined rear measurement;

suppling said front facial features meshed to said collar in the form of data readable by a milling machine to a milling machine; and milling, from said data, so as to reproduce the said front facial features meshed to said collar so as not to change said pre-defined rear measurement.

13. A method of producing a three-dimensional relief of a given head as in claim 12 wherein said milling further comprises the steps of:

producing a relief of the front facial region with said collar from said mold; and joining said relief to a pre-defined rear head section said rear head section having a front measurement matching said rear measurement of said collar so as to produce a complete head when joined.

14. A method of producing a three-dimensional relief of a given head as in claim 12 wherein said milling further comprises the steps of:

milling, from said data, a relief to represent said front facial features meshed to said collar so as not to change said pre-defined rear measurement; and joining said relief to a pre-defined rear head section, said rear head section having a front measurement matching said rear measurement of said collar so as to produce a complete head when joined.

\* \* \* \* \*